(12) United States Patent
Garg et al.

(10) Patent No.: US 12,164,497 B1
(45) Date of Patent: Dec. 10, 2024

(54) EMBEDDING SCALABLE CRM DASHBOARDS IN TRANSACTIONAL PAGES

(71) Applicant: Salesforce, Inc., San Francisco, CA (US)

(72) Inventors: Vandit Garg, Antioch, CA (US); Wenying Yang, San Mateo, CA (US); James Russell Diefenderfer, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/073,486

(22) Filed: Dec. 1, 2022

(51) Int. Cl.
*G06F 16/26* (2019.01)
*G06F 16/23* (2019.01)

(52) U.S. Cl.
CPC ...... *G06F 16/2308* (2019.01); *G06F 16/2379* (2019.01); *G06F 16/26* (2019.01)

(58) Field of Classification Search
CPC ... G06F 16/2308; G06F 16/2379; G06F 16/26
See application file for complete search history.

(56) References Cited

U.S. PATENT DOCUMENTS

| | | | |
|---|---|---|---|
| 4,674,043 A | 6/1987 | Hernandez et al. |
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Urn et al. |
| 5,918,159 A | 6/1999 | Fomukong et al. |
| 5,963,953 A | 10/1999 | Cram et al. |
| 5,983,227 A | 11/1999 | Nazem et al. |
| 6,047,280 A | 4/2000 | Ashby et al. |
| 6,092,083 A | 7/2000 | Brodersen et al. |

(Continued)

OTHER PUBLICATIONS

Non-Final Office Action for U.S. Appl. No. 15/603,111 dated Jul. 3, 2018; 24 pages.

(Continued)

*Primary Examiner* — Tarek Chbouki
(74) *Attorney, Agent, or Firm* — Morgan, Lewis & Bockius LLP

(57) ABSTRACT

A computing device receives a first user interaction with a graphical user interface (GUI) of the computing device. In response to the user interaction, the device sends, to a server system, a request for data corresponding to a first component of the GUI. The device initializes the first component concurrently with the sending. The device receives, from the server system, the data corresponding to the first component and corresponding metadata for the first component. The device generates the first component based on the corresponding metadata and at least a first subset of the received data and displays the first component in a first portion of the GUI. Concurrently with the generating and displaying, the device generates a second component of the GUI based on at least a second subset of the received data, and displays the second component simultaneously with the first component.

20 Claims, 14 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Dice et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,890 B2 | 4/2003 | Mundell |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,651,241 B1 | 11/2003 | Hernandez, III |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkava |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,356,808 B2 | 4/2008 | Bonsteel |
| 7,373,599 B2 | 5/2008 | McElfresh et al. |
| 7,401,094 B1 | 7/2008 | Kesler |
| 7,401,131 B2 | 7/2008 | Robertson |
| 7,403,975 B2 | 7/2008 | Berkery |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | I'sounis et al. |
| 7,620,655 B2 | 11/2009 | Larsson et al. |
| 7,624,338 B2 | 11/2009 | Opitz |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahluen et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,190,619 B2 | 5/2012 | Lehtipalo |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,335,784 B2 | 12/2012 | Gutt |
| 8,457,545 B2 | 6/2013 | Chan |
| 8,468,545 B2 | 6/2013 | Townsend |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,548,973 B1 | 10/2013 | Kritt |
| 8,566,301 B2 | 10/2013 | Rueben et al. |
| 8,589,348 B2 | 11/2013 | Tobin et al. |
| 8,646,103 B2 | 2/2014 | Jakobson et al. |
| 8,688,640 B2 | 4/2014 | Tobin et al. |
| 8,726,240 B2 | 5/2014 | Gallagher et al. |
| 8,745,625 B2 | 6/2014 | Tobin et al. |
| 8,752,017 B2 | 6/2014 | Hossain et al. |
| 8,756,588 B2 | 6/2014 | Zheng et al. |
| 8,818,938 B2 | 8/2014 | Maya et al. |
| 8,930,327 B2 | 1/2015 | Hossain et al. |
| 8,972,439 B2 | 3/2015 | Mathew et al. |
| 9,052,817 B2 | 6/2015 | Hotelling |
| 9,075,618 B2 | 7/2015 | Winternitz |
| 9,092,572 B2 | 7/2015 | Shaphy |
| 9,189,532 B2 | 11/2015 | Tobin et al. |
| 9,201,760 B2 | 12/2015 | Zheng |
| 9,678,935 B2 | 6/2017 | Lu et al. |
| 9,710,542 B2 | 7/2017 | Hendricksen |
| 9,817,891 B1 | 11/2017 | Eksteen et al. |
| 10,114,896 B2 | 10/2018 | Junginger et al. |
| 10,360,136 B2 | 7/2019 | Zheng |
| 10,380,136 B2 | 8/2019 | Zheng et al. |
| 10,438,168 B2 | 10/2019 | Varadharajan et al. |
| 10,489,405 B2 | 11/2019 | Zheng et al. |
| 10,664,535 B1 * | 5/2020 | Hahn ................ G06F 16/9535 |
| 10,725,638 B1 * | 7/2020 | Gardner ............. G06F 3/04845 |
| 11,025,861 B2 * | 6/2021 | Cranfill ................ G06F 3/0488 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |

(56) References Cited

U.S. PATENT DOCUMENTS

| | | |
|---|---|---|
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | I-Ittang et al. |
| 2003/0187921 A1 | 10/2003 | Dicc et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Varner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0143567 A1 | 7/2004 | Dettinger |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0144026 A1 | 6/2005 | Bennett |
| 2007/0150820 A1 | 6/2007 | Salvo |
| 2007/0250472 A1 | 10/2007 | Dettinger et al. |
| 2007/0300151 A1 | 12/2007 | Araki |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky |
| 2011/0247051 A1 | 10/2011 | Bulumulla |
| 2011/0283266 A1 | 11/2011 | Gallagher et al. |
| 2012/0042218 A1 | 2/2012 | Cinarkaya |
| 2012/0158765 A1 | 6/2012 | Kumar et al. |
| 2012/0233137 A1 | 9/2012 | Jakobson et al. |
| 2012/0233694 A1 | 9/2012 | Baliga |
| 2012/0266244 A1 | 10/2012 | Green |
| 2012/0290407 A1 | 11/2012 | Hubbard et al. |
| 2013/0151572 A1 | 6/2013 | Brocato |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkava |
| 2014/0172821 A1 | 6/2014 | Hu |
| 2014/0201194 A1 | 7/2014 | Reddy |
| 2014/0359537 A1 | 12/2014 | Jackobson et al. |
| 2014/0372412 A1 | 12/2014 | Humphrey |
| 2015/0019480 A1* | 1/2015 | Maquaire ............ G06F 16/2365 707/609 |
| 2015/0356188 A1 | 12/2015 | Konik |
| 2016/0162172 A1 | 6/2016 | Rathod |
| 2016/0188686 A1 | 6/2016 | Hopkins |
| 2017/0039577 A1* | 2/2017 | Gauthier ................. G06F 16/26 |
| 2017/0169195 A1 | 6/2017 | LiSanti et al. |
| 2017/0344457 A1 | 11/2017 | Wagiaalla |
| 2018/0300296 A1* | 10/2018 | Ziraknejad .............. G06F 16/93 |
| 2018/0341388 A1 | 11/2018 | Zheng et al. |
| 2018/0341392 A1 | 11/2018 | Zheng |
| 2018/0341572 A1 | 11/2018 | Zheng |
| 2019/0073612 A1 | 3/2019 | Tobin et al. |
| 2019/0095508 A1* | 3/2019 | Porath .................... G06F 16/34 |
| 2019/0121879 A1* | 4/2019 | Canelis ............... G06F 16/9535 |
| 2019/0188334 A1* | 6/2019 | Du .......................... G06F 3/017 |
| 2020/0097095 A1* | 3/2020 | Sirpal ..................... H04N 5/44 |
| 2020/0363939 A1* | 11/2020 | Fitzgerald ........... G06F 3/04845 |
| 2020/0371673 A1* | 11/2020 | Faulkner ................. G06F 3/017 |
| 2020/0394719 A1* | 12/2020 | Sweeney ............... G06Q 40/08 |

OTHER PUBLICATIONS

Zheng, Final Action, U.S. Appl. No. 15/603,111, Jan. 10, 2019, 28 pgs.

Zheng, Notice of Allowance, U.S. Appl. No. 1560311, Mar. 15, 2019.

Zheng, Office Action, U.S. Appl. No. 15/603,303, May 2, 2019, 14 pgs.

Zheng, Final Action, U.S. Appl. No. 15/603,303, Oct. 25, 2019, 16 pgs.

Zheng, Office Action, U.S. Appl. No. 15/603,303, May 11, 2020, 17 pgs.

Zheng, Final Action, U.S. Appl. No. 15/603,303, Dec. 9, 2020, 18 pgs.

Zheng, Notice of Allowance U.S. Appl. No. 15/603,303, Mar. 15, 2021, 10 pgs.

* cited by examiner

Opportunities
My Pipeline ▼

Inspection View 502

Inspection | Flow

Show opportunities closing [This Month ▼] for [My Team]

| Total | Closed Won | Commit | Best Case | Open Pipeline | Closed Lost | Moved In | Moved Out |
|-------|------------|--------|-----------|---------------|-------------|----------|-----------|
| $2.9M | $529K | $990K | $2.1M | $2.4M | $180K | $75K | $38K |

25+ Items · Sorted By Close Date · Filtered By Close Date, My Team, Total ▾

| # | Name | Opportunity... | Amount | Close Date | Stage | Next Step | Account Site | Amended... |
|---|------|----------------|--------|------------|-------|-----------|--------------|------------|
| 1 | ABC Resources Inc - Services - 44K | High | $44,000.00 | 5/1/2022 ↑ | Proposal/Quote | Need to get their decision maker in a room with our exec by end of the week to close this one | Headquarters | |
| 2 | XYZ Insurance - Services | High | $22,500.00 ← | 5/1/2022 ↑ | Qualification | Meeting next week | Branch | |
| 3 | NewHire - New Business - 66K | High | $66,000.00 | 5/1/2022 ↑ | Qualification | Qualifying the prospect's needs | Headquarters | |
| 4 | NewHire - New Business - 22K | High | $21,693.07 | 5/1/2022 ↑ | Qualification | Qualifying the prospect's needs | Headquarters | |
| 5 | Santa Clara Inc. - Service - 55K | Not Available | $110,000.00 | 5/1/2022 ↑ | Closed Won | Quote sent out, waiting for response | Single Location | |
| 6 | Alliance, Inc. - Add-on Business - 35K | High | $105,760.00 | 5/1/2022 ↑ | Qualification | Quote sent out, waiting for response | Single Location | |
| 7 | Viking & Sons Inc. - New Business - 25K | Med | $25,000.00 | 5/22/2022 ↑ | Proposal/Quote | Where do the decision makers stand? | Headquarters | |
| 8 | Green Fields Media - Add-on Business -90K | Not Available | $90,000.00 | 5/5/2022 ↑ | Closed Won | This is targeted to close on Thursday this week. | Branch | |
| 9 | Vandy Enterprises, Inc. - Services - 35K | Med | $35,000.00 | 5/5/2022 ↑ | Proposal/Quote | First call scheduled for this week | Headquarters | |
| 10 | Success Media - Add-on Business -91K | Not Available | $91,400.00 | 5/5/2022 ↑ | Closed Won | Sales presentation to the C-Levels scheduled next week | Headquarters | |
| 11 | Technology, Inc. - Add-on Business - 3K | High | $84,300.00 | 5/5/2022 ↑ | Proposal/Quote | | Single Location | |
| 12 | Well, Inc. - New Business - 250K | High | $250,000.00 | 5/5/2022 ↑ | Proposal/Quote | | Headquarters | |
| 13 | Green Media - Add-on Business | Not Available | $63,000.00 | 5/5/2022 ↑ | Closed Won | Waiting for approvals | Headquarters | |
| 14 | Orangery, Inc. - Add-on Business | Med | $54,360.00 ← | 5/5/2022 ↓ ⊗ | Qualification | Set up meeting with execs | Headquarters | |
| 15 | Vandy Enterprises, Inc. - Services | Not Available | $81,000.00 | 5/5/2022 ↑ | Closed Won | Follow up in 6 months to see if needs have changed | Branch | |
| 16 | Advanced Software - New Business | High | $130,000.00 | 5/5/2022 ↑ | Negotiation | Send updated quote | Headquarters | |
| 17 | Advanced Software - Add On Business | High | $97,000.00 | 5/5/2022 ↑ | Discovery | Preparing for demo | Headquarters | |
| 18 | Advanced Software - Services | Med | $175,000.00 → | 5/5/2022 ↑ | Proposal/Quote → | Meeting set for next week | Headquarters | |
| 19 | Universe Commerce - Add-on Business - 75K | High | $75,000.00 | 5/5/2022 ↑ | Negotiation | First call scheduled for this week | Headquarters | |

Last updated a few seconds ago — New List View

Figure 5A

EMBEDDING SCALABLE CRM DASHBOARDS IN TRANSACTIONAL PAGES

RELATED APPLICATIONS FIELD

This application is related to the following applications, each of which is incorporated by reference herein in its entirety:
(i) U.S. patent application Ser. No. 15/603,303, filed May 23, 2017, entitled "Modular Runtime Environment," now U.S. Pat. No. 11,054,971, issued on Jul. 6, 2021; and
(ii) U.S. patent application Ser. No. 15/603,111, filed May 23, 2017, entitled "Dashboard Execution Engine," now U.S. Pat. No. 10,360,136, issued on Jul. 23, 2019.

TECHNICAL FIELD

The disclosed implementations relate generally to systems, methods, and user interfaces that embed analytics capabilities from customer relationship management analytics (CRMA) dashboards into transactional dashboards in a performant way.

BACKGROUND

Transactional dashboards (also referred to herein as core CRM dashboards/applications or transactional applications) provide a broad overview of sales activity and key performance indicators (KPIs). A transactional dashboard typically includes new leads and deals, sales pipelines, KPIs, and recent and upcoming activities. CRMA dashboards (also referred to herein as business analytics data dashboards, analytics dashboards, or analytics user interfaces), on the other hand, are "business intelligence style" applications whose sole focus is on reporting and analytics.

SUMMARY

Transactional dashboards (e.g., Salesforce Core CRM applications) provide a quick snapshot of an organization's sales activity and KPIs. CRMA dashboards (e.g., Tableau CRM (TCRM) dashboards), on the other hand, are "business intelligence style" applications whose sole focus is on reporting and analytics. In other words, users would typically perform transactional work using a core CRM application and then separately go to a CRMA dashboard to "slice and dice" data.

In general, data is not simultaneously available (or refreshed) in both transactional and CRMA dashboards. For example, data that is available for viewing on a transactional dashboard can be different from data that is available for analysis on a CRMA dashboard because of time lags in synchronization (e.g., ~8 to 10 hours) between the two dashboards. This "data gap" can lead to differences in perceptions about an organization's performance by the sales team and the business analytics team.

Integration between transactional dashboards and CRMA dashboards have traditionally been based on CRMA template-based dashboards. However, such integrated dashboards can take a long time (e.g., from 10 to 20 seconds) to bootstrap and load. Consequently, these integrated dashboards do not meet the page load performance requirements (e.g., ~1.5 to 5 seconds) of CRM applications providers such as Salesforce®.

Accordingly, there is a need for improved systems, methods, and devices that integrate the capabilities of transactional and CRMA dashboards while meeting the page load technical performance requirements.

The present disclosure provides a method and system for embedding at least a portion of a CRMA dashboard (e.g., a data dashboard, or one or more data visualizations or charts) onto a transactional dashboard (e.g., an embedding page) while meeting the performance load time requirement of ~5 seconds or less. According to some implementations of the present disclosure, data is "injected" into the embedded component (e.g., a CRMA dashboard or data visualization) as metadata at load/bootstrap time. The transactional dashboard retrieves data (e.g., from a backend server) to generate the embedded component, even when the portion of the CRMA dashboard has yet to be generated and/or displayed on the transactional user interface. Because the transactional dashboard has the data from the first call to backend server, it can inject a subset of the data that is needed to generate the embedded component at runtime.

Accordingly, the systems and/or methods disclosed provide an innovative technical solution to inject data into the CRMA dashboard at runtime. The disclosed methods and/or systems advantageously improve load time performance requirements of embedded dashboards and improve user experience and satisfaction.

The systems, methods, and devices of this disclosure have several innovative aspects, no single one of which is solely responsible for the desirable attributes.

In accordance with some implementations, a method for embedding analytical visualizations in transactional dashboards is performed at a computing device. The computing device includes a display, one or more processors, and memory. The memory stores one or more programs configured for execution by the one or more processors. The method comprises receiving a first user interaction with a graphical user interface of the computing device. The method comprises, in response to the user interaction, sending to a server system a request for data corresponding to a first component of the graphical user interface. The server system is distinct from the computing device. The method comprises, concurrently with the sending, initializing the first component. The method comprises receiving, from the server system, the data corresponding to the first component and corresponding metadata for the first component. The corresponding metadata includes one or more attributes and data values for the one or more attributes. The method comprises, in response to receiving the data and the corresponding metadata: generating the first component based on the corresponding metadata and at least a first subset of the received data and displaying the first component in a first portion of the graphical user interface. The method also comprises, concurrently with the generating and displaying the first component, generating a second component of the graphical user interface based on at least a second subset of the received data. The method comprises displaying the second component, simultaneously with the first component, in a second portion of the graphical user interface that is distinct from the first portion.

In some implementations, the first component is a data dashboard having one or more data visualizations. The second component is a data table that includes a plurality of data rows and a plurality of data columns.

In some implementations, the one or more data visualizations include a Sankey chart.

In some implementations, the graphical user interface is an interface corresponding to a first application. The first component is an embedded component corresponding to a second application that is distinct from the first application and displayed within the first application.

In some implementations, the second component is a component corresponding to the first application.

In some implementations, the first application is operable in a first mode and operable in a second mode. The first user interaction comprises user selection of an interface element corresponding to the second mode in the graphical user interface.

In some implementations, the first component is a data dashboard. Initializing the first component on the graphical user interface includes rendering a skeletal view of the data dashboard based on initial metadata stored on the computing device and displaying the skeletal view of the data dashboard in the graphical user interface.

In some implementations, the method further comprises, in response to receiving the data and the metadata, updating the initial metadata with the corresponding metadata. Generating the first component includes re-rendering the data dashboard by populating the skeletal view with data elements according to the received data and the corresponding metadata.

In some implementations, the method further comprises receiving a second user interaction via the second component of the graphical user interface. The method further comprises, in response to the second user interaction: generating an updated view of the first component and displaying the updated view of the first component in the first portion of the graphical user interface.

In some implementations, the method further comprises storing the corresponding metadata on the computing device.

In some implementations, a computing device includes a display, one or more processors, memory, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors and memory. The one or more programs include instructions for performing any of the methods described herein.

Thus methods, systems, and graphical user interfaces are disclosed that enable users to embed analytics capabilities from customer relationship management analytics (CRMA) dashboards in transactional dashboards.

Note that the various implementations described above can be combined with any other implementations described herein. The features and advantages described in the specification are not all inclusive. In particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 5A to 5F provide a series of screen shots for interactions with a graphical user interface corresponding to a transactional dashboard, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
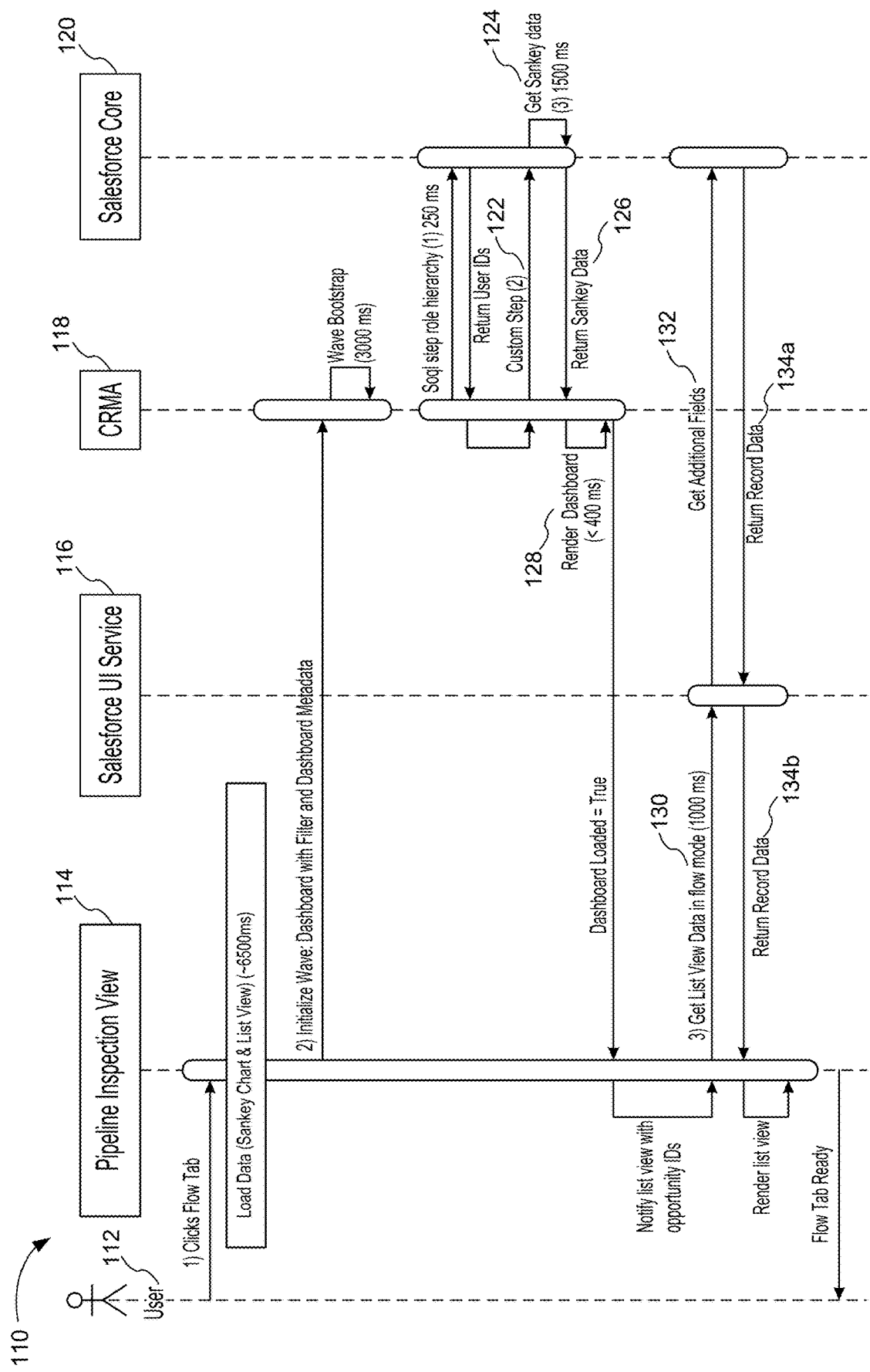
FIG. 1 provides a sequence diagram for embedding a CRMA component in the user interface of a transactional dashboard according to some implementations.

FIG. 1 provides a sequence diagram 110 for embedding a CRMA component in a user interface of a transactional dashboard according to a conventional design.

The sequence diagram 110 includes a Pipeline Inspection View 114, a Salesforce User Interface (UI) Service 116, a CRMA 118, and a Salesforce Core 120.

The pipeline inspection view 114 is a view of a transactional dashboard (e.g., the transactional application 230 described below in FIG. 3), which includes a graphical user interface, such as the graphical user interface 500 shown in FIGS. 5A to 5F.

The Salesforce UI Service 116 is a backend service that communicates with the Salesforce Core server 120 to obtain data for component(s) of the graphical user interface. In some implementations, the components of the graphical user interface include a first component corresponding to at least a portion of a CRMA dashboard (e.g., data visualizations, such as the Sankey chart 520 in FIGS. 5B to 5F). In some implementations, the components of the graphical user interface include a first component corresponding to a data table (e.g., the list view 540 in FIGS. 5B to 5F) of the transactional dashboard.

The CRMA 118 is a Salesforce CRM Analytics server. In some implementations, the CRMA 118 hosts at least a portion of the CRMA dashboard. The CRMA dashboard can include one or more data visualizations. In some instances, the one or more data visualizations include a Sankey chart, such as the Sankey chart 520 in FIGS. 5B to 5F).

The Salesforce Core server 120 is a Salesforce core application server. In some implementations, the Salesforce Core server 120 is part of a backend server for the transactional dashboard. In some implementations, the Salesforce Core server 120 communicates with databases to obtain raw records for the CRMA dashboards (e.g., the Sankey chart 520).

In the example of FIG. 1, a portion of the CRMA dashboard (e.g., the Sankey chart) is embedded in the transactional page (e.g., the Pipeline Inspection View 114) using a "custom step." As used herein, a "step" (i.e., a Salesforce step) is part of a flow (i.e., a Salesforce flow). A flow consists of a set of steps. In some implementations, a user-defined data structure is created for a step.

A major drawback of embedding an analytical dashboard in a transactional page using the process illustrated in FIG. 1 is performance. Specifically, applications would need to make two round trips to the database (e.g., at the Salesforce Core server 120). The first trip is to retrieve data for the CRMA dashboard, as shown in steps 122, 124, 126, and 128 in FIG. 1. The second trip is to retrieve the same data for the embedding page (e.g., the transactional UI), as illustrated in steps 130, 132, 134a, and 134b in FIG. 1. Two trips are needed because there is no way to share code or runtime objects within Aura/lightning web component (LWC) pages and the CRMA stack.

FIG. 1 illustrates that in the conventional design, the estimated performance time (load time) is ~6500 ms (including ~3000 ms to load the CRMA dashboard component, ~2150 ms to retrieve Sankey data and render dashboard, and ~1000 ms to retrieve list view data).

Figure 2:
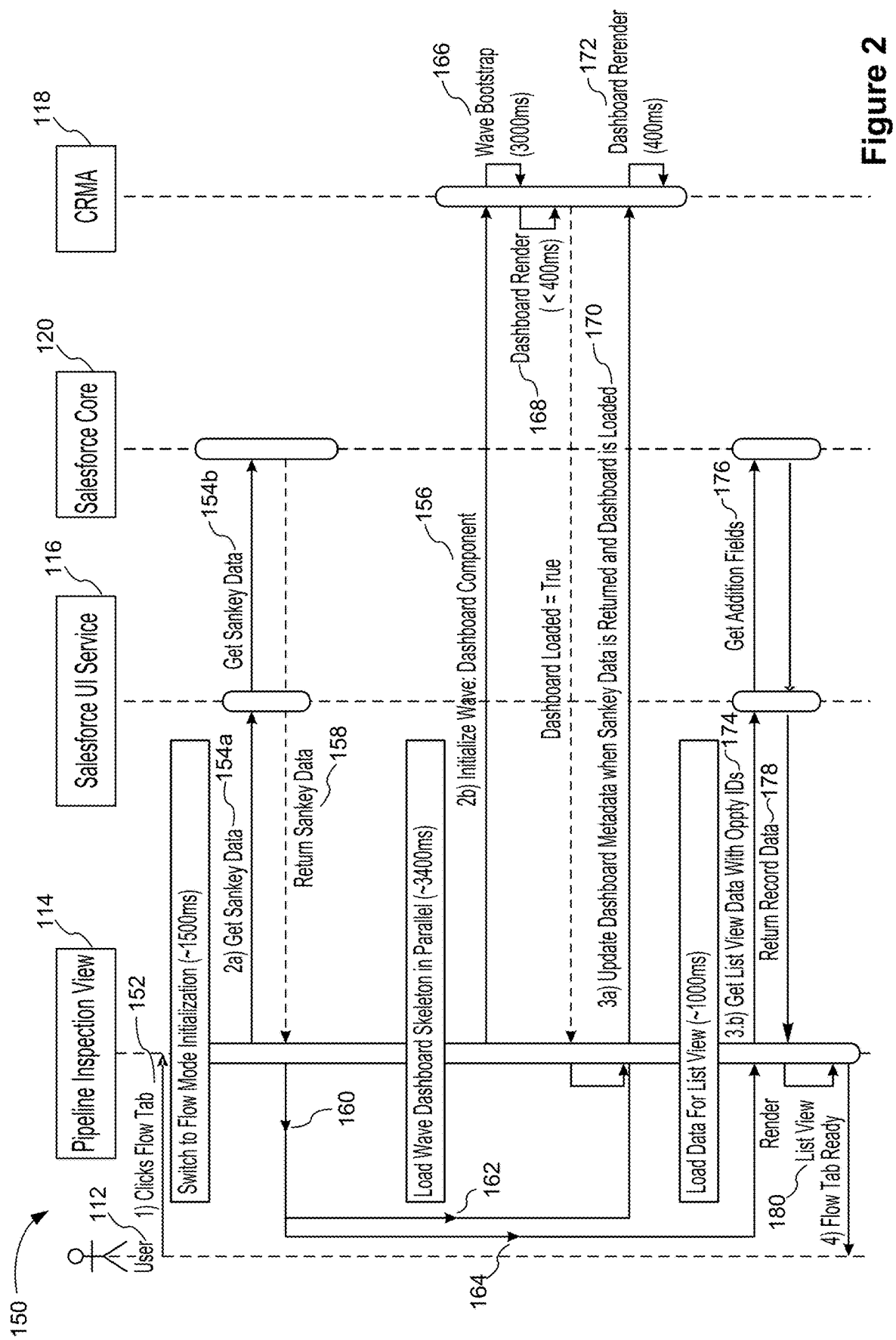
FIG. 2 provides a sequence diagram for embedding a CRMA component in the user interface of a transactional dashboard according to some implementations.

FIG. 2 provides a sequence diagram 150 for embedding a CRMA component in a user interface of a transactional dashboard according to an improved design.

In some implementations, the creation of an embedded page (e.g., a user interface with embedded components) is initiated in response to user interaction with the transactional dashboard. For example, FIG. 2 illustrates that the process for embedding analytical visualizations in transactional dashboards is triggered by a user 112 clicking (152) (e.g., selecting) a "flow" tab of the Pipeline Inspection View 114 (e.g., the flow tab 512 in FIG. 5B).

In some implementations, in response to the user interaction, the Pipeline Inspection View 114 sends a request for data to the Salesforce Core server 120 via the Salesforce UI service 116. This is illustrated by steps 154a and 154b.

In some implementations, while (e.g., during, concurrently with, or simultaneously with) sending the request for data, the Pipeline Inspection View 114 sends a command to the CRMA server 118 (e.g., Salesforce CRM Analytics server) to initialize a CRMA dashboard component (e.g., also known as a "wave dashboard" component in Salesforce). This is illustrated in step 156.

In some implementations, after receiving the command to initialize the CRMA dashboard component (step 156), the CRMA server 118 bootstraps the CRMA dashboard component (step 166) and renders the CRMA dashboard component (step 168). In some implementations, in the bootstrapping step (i.e., step 166), the CRMA server 118 loads HTML, Javascript, and/or CSS files in order to render the CRMA dashboard component. In some implementations, after the bootstrapping, the user interface for the transactional dashboard displays a text label (e.g., "Loading . . . ") at the region corresponding to the CRMA dashboard component.

In accordance with some implementations of the present disclosure, in response to sending the request for data (steps 154a and 154b), the Pipeline Inspection View 114 receives (158) data corresponding to the CRMA dashboard component, corresponding metadata for the CRMA dashboard component, and/or data to generate a list view (e.g., a second component in the transactional UI). Stated another way, data (and metadata) that is returned by the Salesforce Core server 120 in step 158 to the Pipeline Inspection View 114 is utilized (e.g., shared) (e.g., simultaneously or concurrently) by both the CRMA dashboard 118 and the Pipeline Inspection View 114 (e.g., the transactional dashboard). This is also illustrated by the flow line represented by arrow 160, which branches into two parallel flow lines represented by arrows 162 and 164. Sharing data goes against the norm of object-oriented design because the CRMA dashboard and the transactional dashboard are two distinct, separate object entities. However, in the present disclosure, the data sharing is preferred because it improves the efficiency of the process and decreases the load time.

In some implementations, the transactional dashboard (e.g., the Pipeline Inspection View 114) generates the CRMA dashboard component (e.g., the CRMA dashboard component 516 in FIG. 5B) using the corresponding metadata and at least a first subset of the received data. This is illustrated by the flow line represented by the arrow 162, and steps 170 and 172.

In some implementations, the corresponding metadata includes a state of the CRMA dashboard component, such as dashboard size, label positions, and/or information that defines the layout of the CRMA dashboard component.

In some implementations, the transactional dashboard (e.g., the Pipeline Inspection View 114) generates a list view (e.g., the list view component 518 in FIG. 5B) based on at least a second subset of the received data. This is illustrated by the flow line represented by the arrow 164 and steps 174, 176, 178, and 180.

In some implementations, initializing the CRMA dashboard component on the graphical user interface of the transactional dashboard (step 156) includes rendering a skeletal view of the CRMA dashboard based on initial metadata. The initial metadata can be stored locally on the computing device executing the transactional dashboard (e.g., the computing device 200) or retrieved from a server system executing a web version of the transactional dashboard (e.g., the server system 300). The initial dashboard metadata is used as a skeleton to load CRMA dashboard UI chunks for better performance. In some implementations, after the Pipeline Inspection View 114 receives the requested data (in step 158), the CRMA dashboard metadata is updated to show deals.

The estimated performance time can be computed as Maximum {(get Sankey data+load and render list view), (load wave dashboard skeleton+re-render dashboard with Sankey data)}, which is ~3800 ms. Accordingly, the improved design of FIG. 2 has faster performance compared to the design in FIG. 1.

Figure 3:
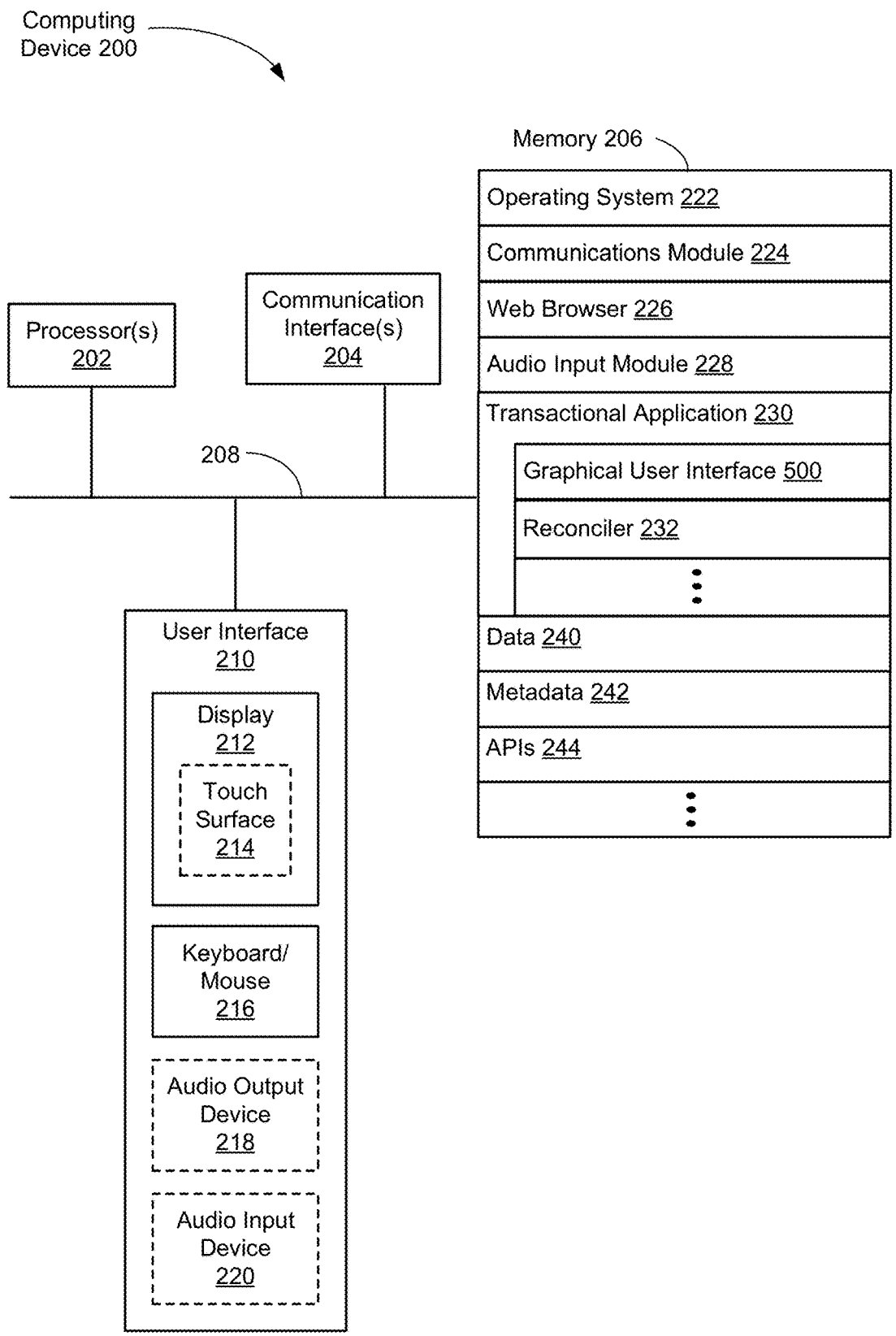
FIG. 3 is a block diagram of a computing device according to some implementations.

FIG. 3 is a block diagram illustrating a computing device 200 that can display a graphical user interface 500 (see FIGS. 5A to 5F) in accordance with some implementations. Various examples of the computing device 200 include a desktop computer, a laptop computer, a tablet computer, and other computing devices that have a display and a processor capable of running a transactional application 230 (e.g., the core CRM application or Pipeline Inspection View 114). The computing device 200 typically includes one or more processing units (processors or cores) 202, one or more network or other communication interfaces 204, memory 206, and one or more communication buses 208 for interconnecting these components. In some implementations, the communication buses 208 include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/ double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206, or the computer-readable storage medium of the memory 206, stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module), which processes audio captured by the audio input device 220. The captured audio may be sent to a remote server (e.g., the server system 300) and/or processed by an application executing on the computing device 200 (e.g., the transactional application 230 or a natural language processor);
- a transactional application 230 (e.g., the Salesforce Core CRM application or a transactional dashboard), which provides a broad overview of sales activity and KPIs. In some implementations, the transactional application 230 includes new leads and deals, sales pipelines, KPIs, and recent and upcoming activities. In some implementations, the application 230 includes:
  - a graphical user interface 500 for displaying sales activity, KPIs, and/or embedded components; and
  - a reconciler 232, which reconciles data and metadata that are shared between the transactional application 230 and an embedded component (e.g., an embedded CRMA dashboard component);
- Data 240;
- Metadata 242; and
- APIs 244, which may be called from one or more applications (e.g., the web browser 226 and the application 230), and perform one or more actions.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above. In some implementations, a subset of the programs, modules, and/or data stored in the memory 206 is stored on and/or executed by the server system 300.

Although FIG. 3 shows a computing device 200, FIG. 3 is intended more as a functional description of the various features that may be present rather than as a structural schematic of the implementations described herein. In practice, and as recognized by those of ordinary skill in the art, items shown separately could be combined and some items could be separated.

Figure 4:
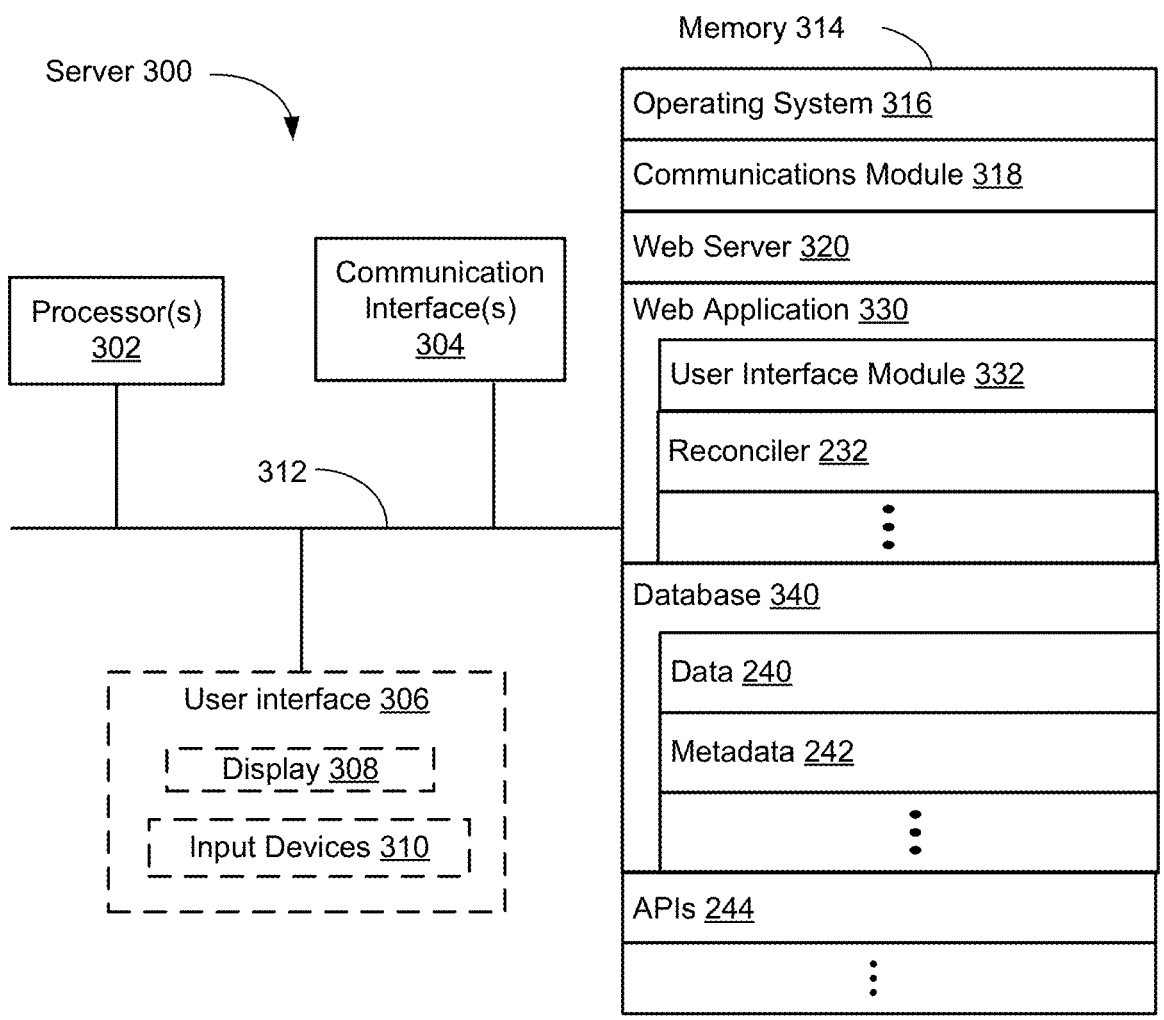
FIG. 4 is a block diagram of a server system according to some implementations.

FIG. 4 is a block diagram of a server system 300 in accordance with some implementations. In some implementations, the server system 300 is the Salesforce Core server 120 illustrated in FIGS. 1 and 2. The server system 300 typically includes one or more processing units/cores (CPUs) 302, one or more network interfaces 304, memory 314, and one or more communication buses 312 for interconnecting these components. In some implementations, the server system 300 includes a user interface 306, which includes a display 308 and one or more input devices 310, such as a keyboard and a mouse. In some implementations, the communication buses 312 include circuitry (sometimes called a chipset), which interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPUs 302. The memory 314, or alternatively the non-volatile memory devices within the memory 314, comprises a non-transitory computer readable storage medium.

In some implementations, the memory 314 or the computer readable storage medium of the memory 314 stores the following programs, modules, and data structures, or a subset thereof:

- an operating system 316, which includes procedures for handling various basic system services and for performing hardware dependent tasks;
- a network communications module 318, which is used for connecting the server 300 to other computers via the one or more communication network interfaces 304 (wired or wireless) and one or more communication networks, such as the Internet, other wide area networks, local area networks, metropolitan area networks, and so on;

a web server 320 (such as an HTTP server), which receives web requests from client devices (such as the computing device 200) and responds by providing responsive web pages or other resources;

a web application 330 (e.g., the transactional dashboard web application), which may be downloaded and executed by a web browser 226 on a user's computing device 200. In general, a web application 330 has the same functionality as the desktop application 230, but provides the flexibility of access from any device at any location with network connectivity, and does not require installation and maintenance. In some implementations, the web application 330 includes various software modules to perform certain tasks, such as:

a user interface module 332, which provides the user interface for all aspects of the web application 330; and a reconciler 232 for reconciling data and metadata that are shared between the transactional application and an embedded component (e.g., an embedded CRMA dashboard component);

In some implementations, the server system 300 includes a database 340. In some implementations, the database 340 stores:

data 240; and/or metadata 242 (e.g., metadata corresponding to the CRMA dashboard component)

The database 340 may be separate from the server system 300, or may be included with the server system 300, or both.

In some implementations, the server system 300 includes APIs 244. The APIs enable calls from one or more applications (e.g., applications on the computing device 200), translating the API calls into appropriate actions, and performing one or more actions.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 4 shows a server system 300, FIG. 4 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server system 300 may be stored or executed on a computing device 200. In some implementations, the functionality and/or data may be allocated between a computing device 200 and one or more servers 300. Furthermore, one of skill in the art recognizes that FIG. 4 need not represent a single physical device. In some implementations, the server functionality is allocated across multiple physical devices in a server system. As used herein, references to a "server" include various groups, collections, or arrays of servers that provide the described functionality, and the physical servers need not be physically colocated (e.g., the individual physical devices could be spread throughout the United States or throughout the world).

FIGS. 5A to 5F provide a series of screen shots of a graphical user interface 500 corresponding to a transactional application 230 (e.g., the core CRM application) according to some implementations.

FIG. 5A provides a view 502 of the graphical user interface 500 when the transactional application 230 operates in an "inspection" mode (e.g., the pipeline inspection mode). In some implementations, the transactional application 230 operates in the inspection mode when a user selects the "Inspection" tab 504 in the graphical user interface 500. FIG. 5A illustrates that, in the inspection mode, the graphical user interface 500 displays a list of opportunities (e.g., as a data table 506) and KPIs 508.

Figure 5B:
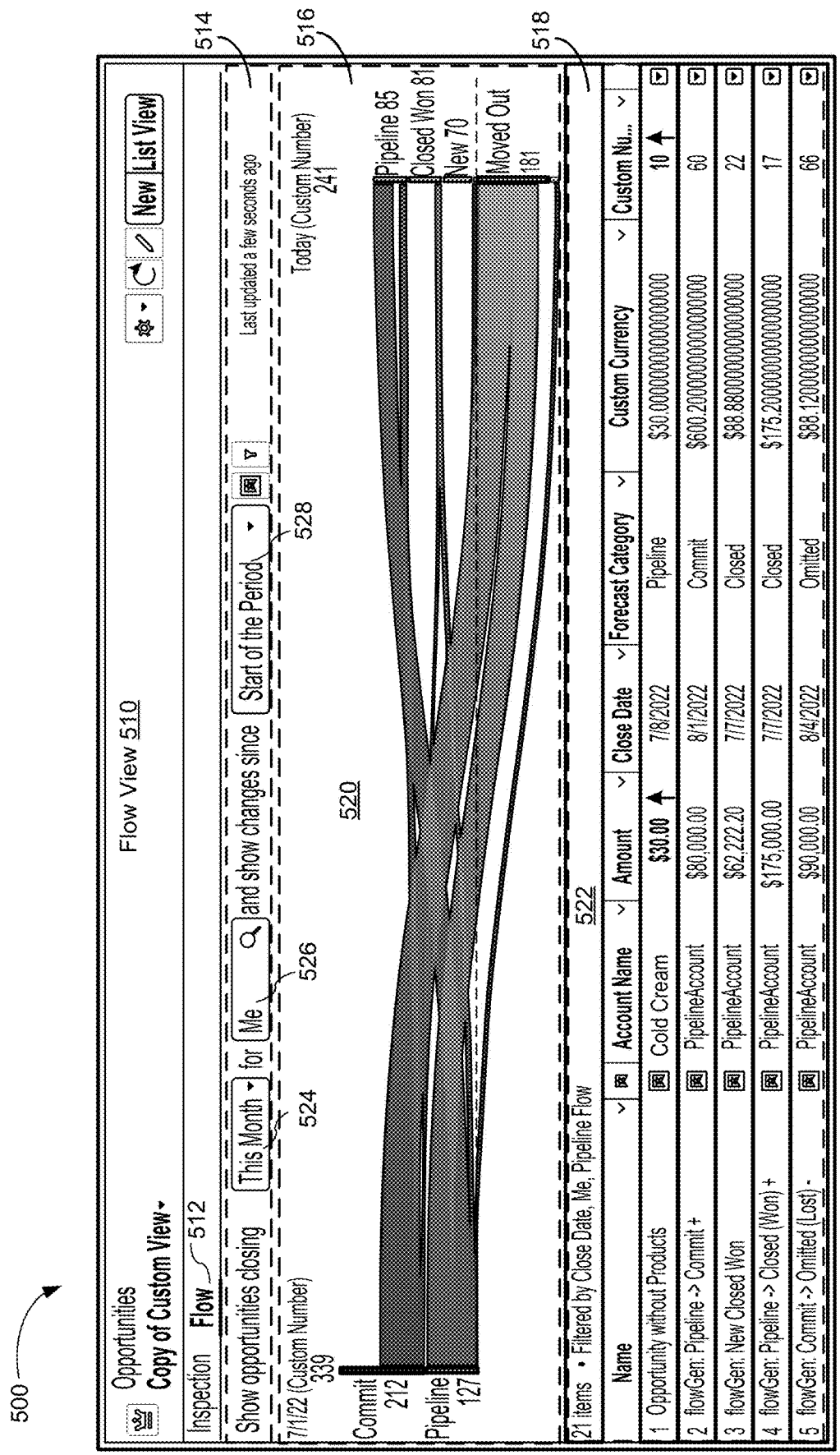

FIG. 5B provides a view 510 of the graphical user interface 500 when the transactional application 230 operates in a "flow" mode. In some implementations, the transactional application 230 operates in the flow mode when a user selects the "Flow" tab 512 in the graphical user interface 500. FIG. 5B also illustrates that, in the flow mode, the graphical user interface 500 includes a filter region 514, a CRMA dashboard component 516, and a list view component 518. The list view component 518 is a component corresponding to the transactional dashboard (e.g., the transactional application 230).

In the example of FIG. 5B, the CRMA component comprises a Sankey chart 520 that shows changes to opportunities in different forecast categories over time. Users can input one or more filter values to specify the opportunities they would like to focus on. For example, a user can apply a first filter 524 to specify a close date, apply a second filter 526 to specify a user, and apply a third filter 528 to specify the time period to be displayed on the chart. The graphical user interface 500 can display an updated Sankey chart, which shows deals according to the selections of the filters 524, 526, and/or 528 in the filter region 514 (e.g., using the process to obtain Sankey data as illustrated in the sequence diagram in FIG. 2).

In some implementations, the CRMA dashboard component 516 includes one or more data visualizations, such as a Sankey chart, a line plot, a bar chart, a column chart, and/or a map.

In some implementations, the list view component 518 comprises a data table 522, which includes a subset of data rows and/or data columns of the data table 506 that is depicted in FIG. 5A. In some implementations, the data rows and/or data columns in the data table 522 share common data fields and/or data values with the CRMA dashboard component 516.

In some implementations, user selection of a portion of the Sankey chart will filter data in the list view (e.g., the data table 522) to the subset of data rows and/or data columns corresponding to the selected portion of the Sankey chart.

Figure 5C:
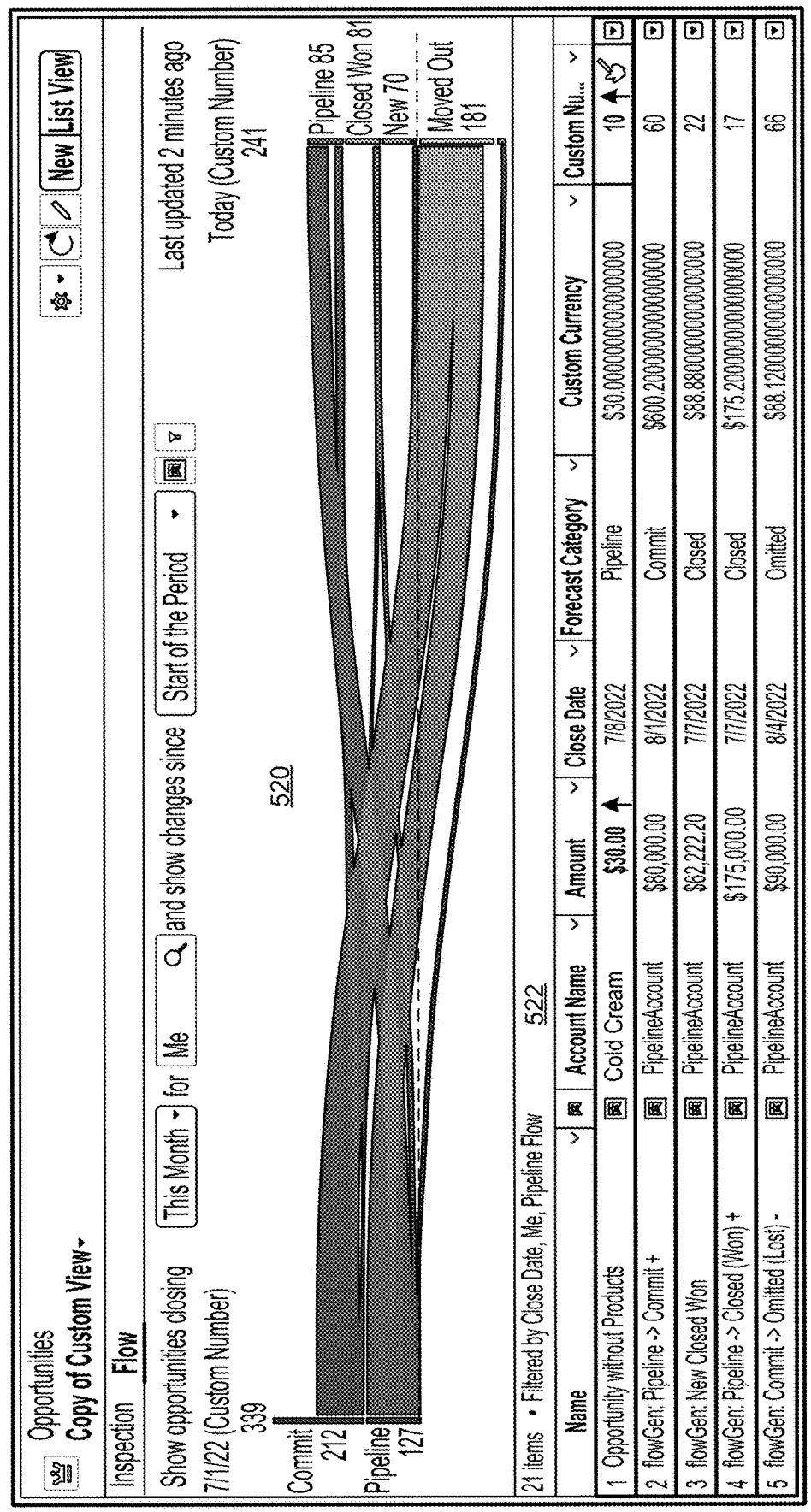
Figure 5D:
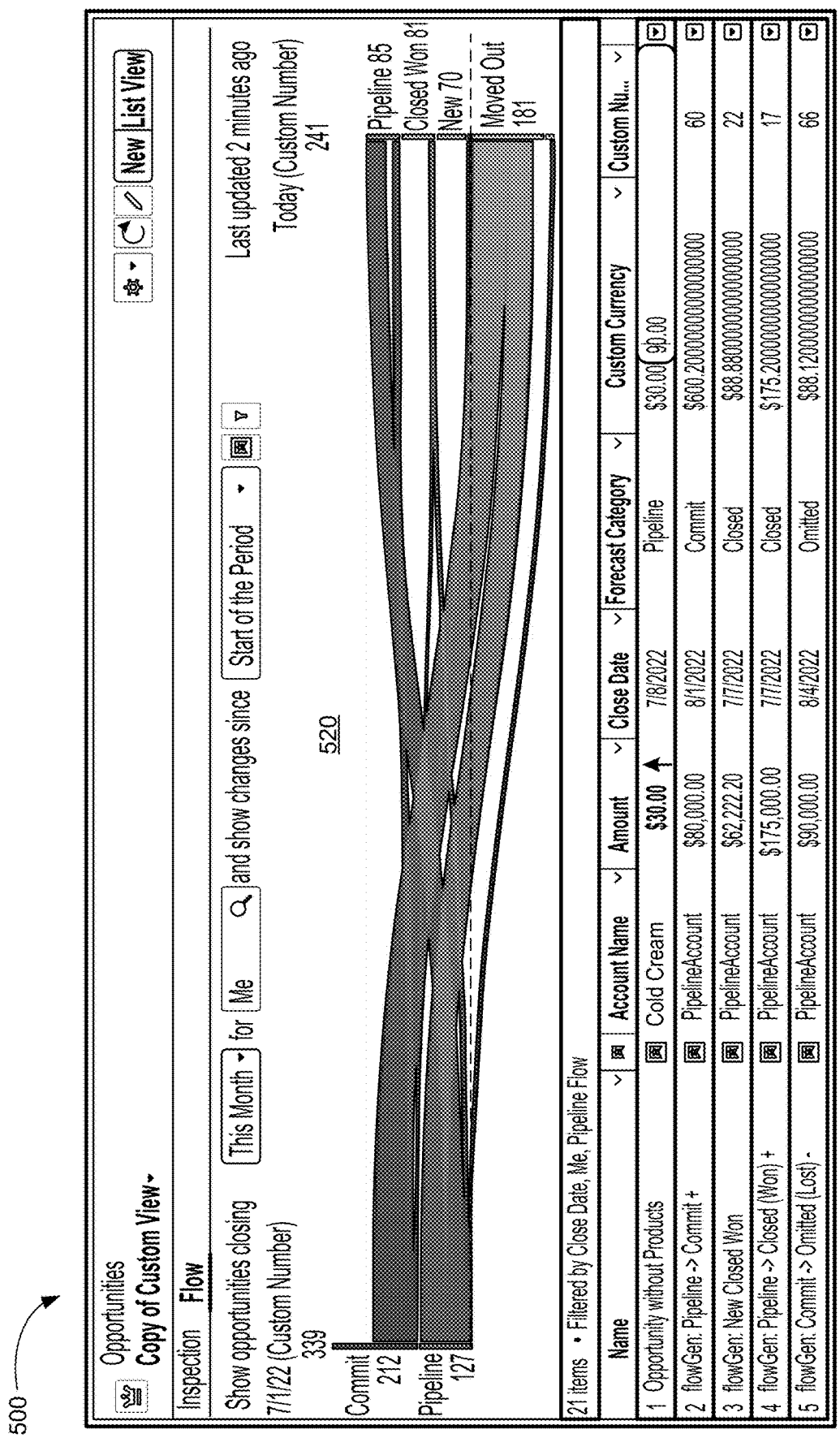
Figure 5E:
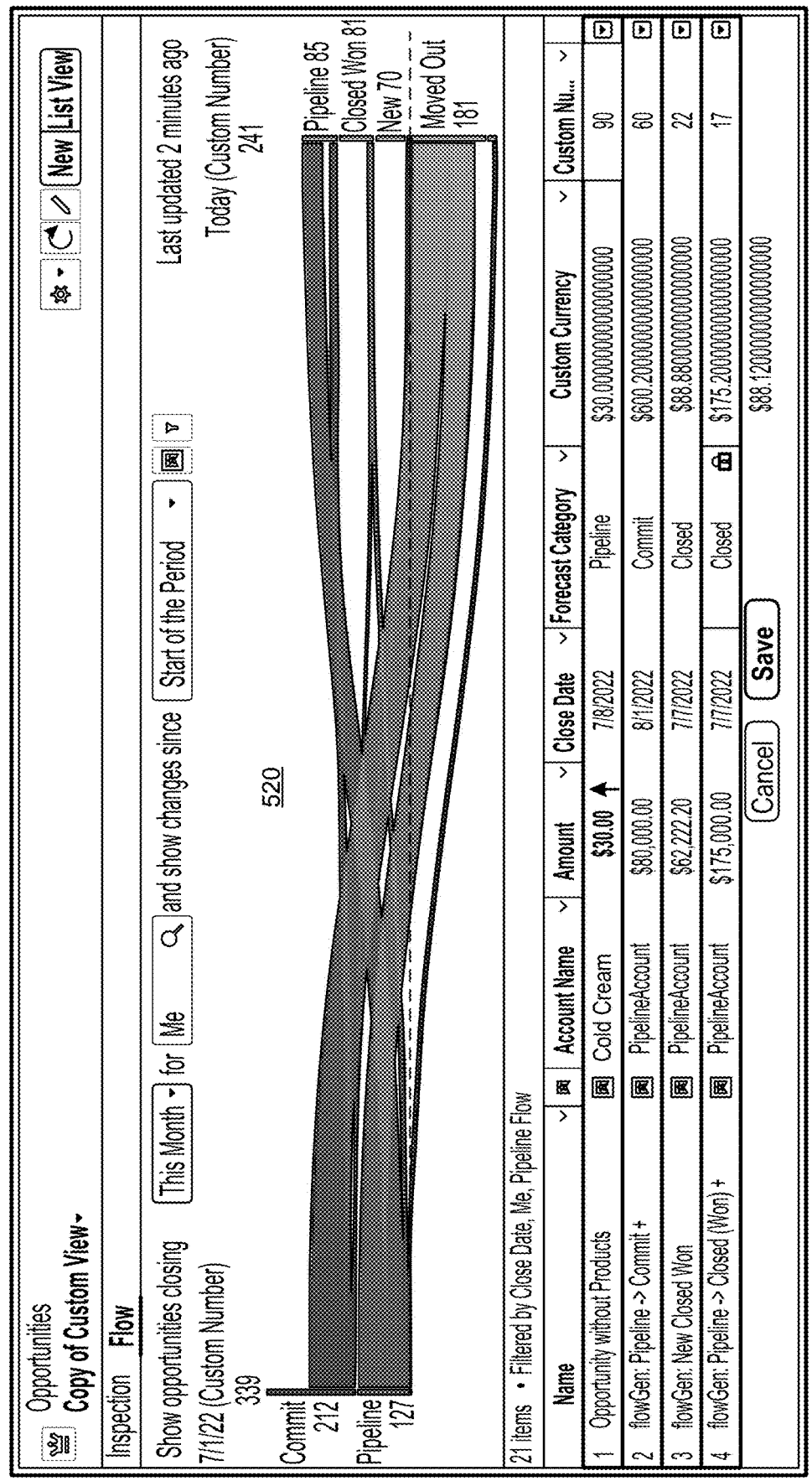
Figure 5F:
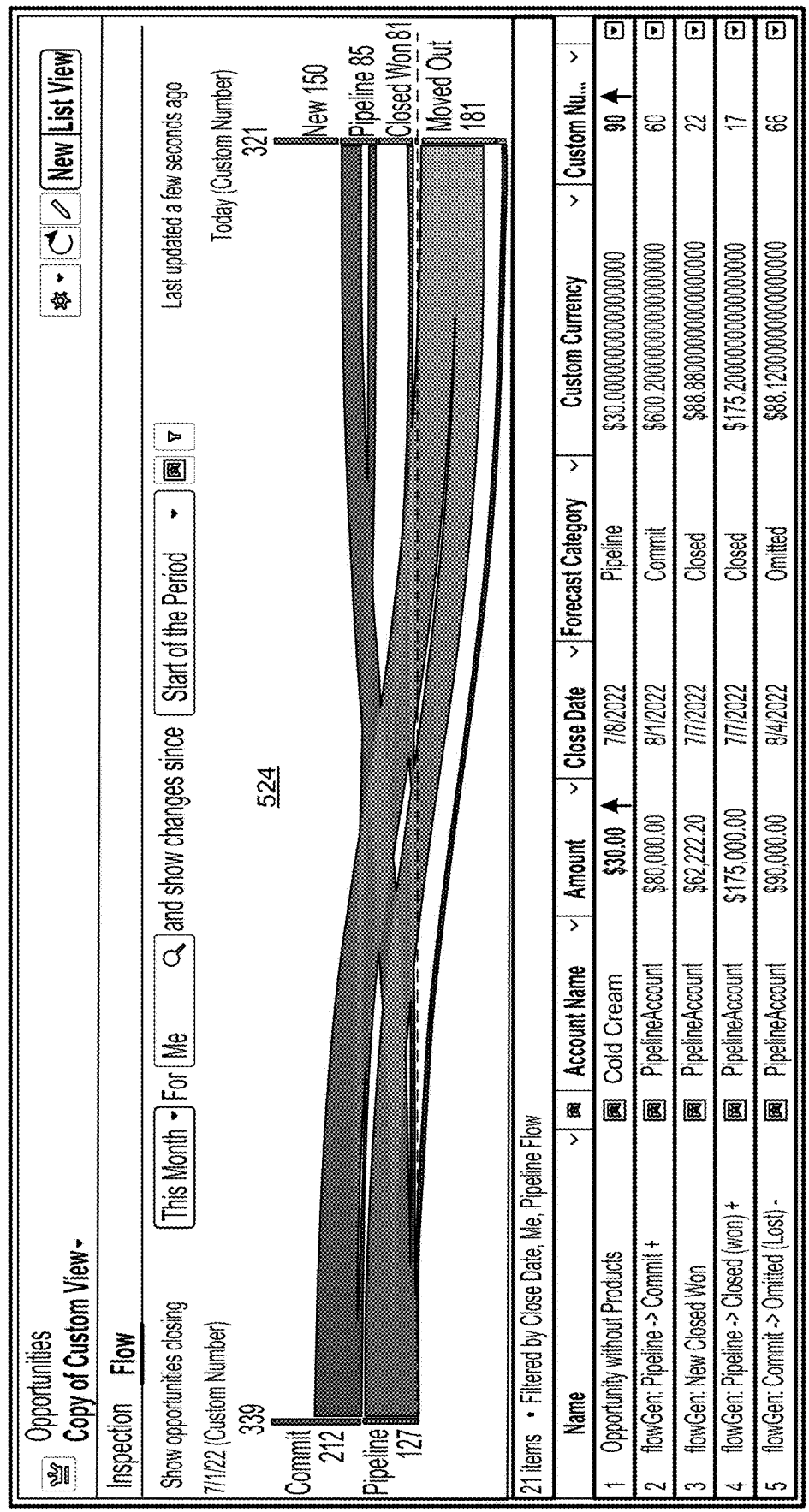

FIGS. 5C, 5D, and 5E illustrate user interaction with the data table 522 (e.g., the list view component 518). In this example, the user changes the data value 10 corresponding to a data field "Custom Number" for the first row in the grid (Account Name="Cold Cream"). FIG. 5F illustrates that, in response to the user interaction, the graphical user interface 500 displays an updated Sankey chart 524. Because the edit from 10 to 90 created 80 new "opportunities," the "new" category in the Sankey chart goes from 70 (before the change) to 150 (after the change). The right side of the Sankey chart shows the change, both in the "new" category and in the "Today" total.

In some implementations, when the filters and/or list view changes, the Pipeline inspection component (e.g., Pipeline Inspection View 114 in FIG. 2) retrieves updated Sankey data and updates dashboard metadata.

Figure 6:
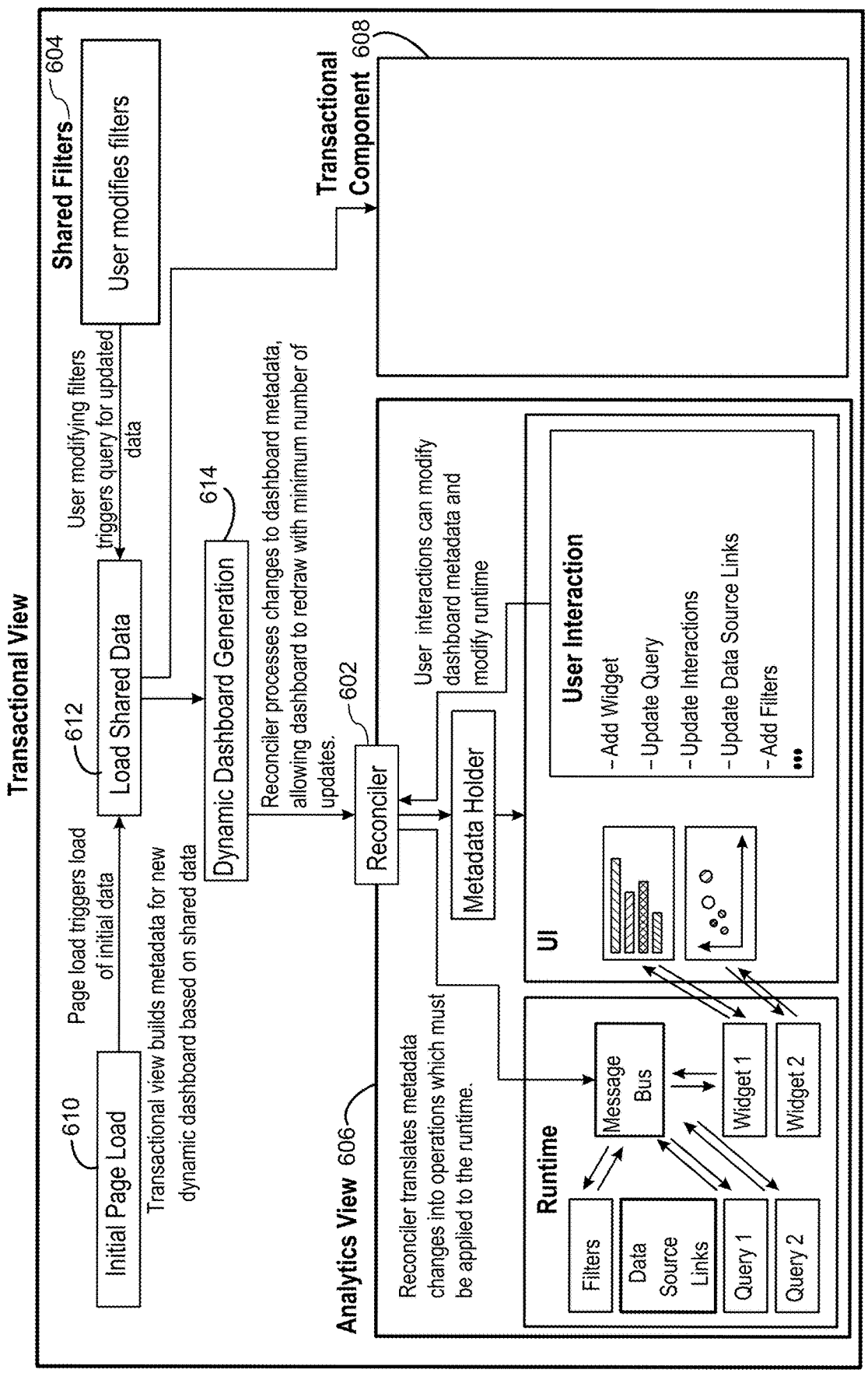
FIG. 6 is a functional diagram of a dashboard reconciler according to some implementations.

FIG. 6 is a functional diagram of a computing device 200 that includes a dashboard reconciler 602 according to some implementations. In some implementations, the dashboard reconciler 602 corresponds to the reconciler 232 in FIG. 3 and/or FIG. 4.

In the example of FIG. 6, shared filters 604 correspond to the filter region 514 in FIG. 5B. The analytics view 606 corresponds to the CRMA dashboard component 516 in FIG. 5B, and the transactional component 608 corresponds to the list view component 518 in FIG. 5B.

Referring to FIG. 6, the computing device 200 initializes (610) the page load. In some implementations, the initialization of the page load is triggered by user navigation in the graphical user interface 500 or the web browser 226 (for the web version) to the Pipeline Inspection view (e.g., pipeline inspection view 502 in FIG. 5A). The computing device 200 loads (612) the shared data. Shared data is data that is shared by the CRMA dashboard component and the transactional dashboard component. In the example of FIGS. 5B to 5F, "shared data includes a list of Opportunity records with information about each opportunity (e.g., the owner, status, and account). In some implementations, initial data is meant to be the same as shared data, but reflects the initial set of data before a user has modified any shared filters.

In some implementations, the computing device 200 loads shared data using a data structure like:

```
[
{startStageName: "Commit", endStageName: "Commit", count: 87},
{startStageName: "Commit", endStageName: "Closed Won", count: 47},
{startStageName: "Commit", endStageName: "Moved Out", count: 94},
...
]
```

FIG. 6 illustrates that the computing device 200 generates (614) a dashboard based at least in part on the shared data. In some implementations, the computing device 200 generates the dashboard using a data structure like:

```
{
    steps: {
        query_1: {
            type: "static",
            values: [
                ...
            ],
            ...
        }
    }
    widgets: {
        sankey: {
            type: "chart",
            parameters: {
                step: "query_1"
            }
        }
    },
    ...
}
```

In accordance with some implementations of the present disclosure, the dashboard reconciler 602 allows user interactions (described as declarative updates to the dashboard metadata) to seamlessly update the graphical user interface 500 and a modular runtime environment. Details of the modular runtime environment are described in U.S. patent application Ser. No. 15/603,303, filed May 23, 2017, entitled "Modular Runtime Environment," now U.S. Pat. No. 11,054,971, which issued on Jul. 6, 2021, and is incorporated by reference herein in its entirety.

In some implementations, dashboard changes such as adding a widget, updating a query, adding references between steps using programmatic bindings (see https://resources.docs.salesforce.com/latest/latest/en-us/sfdc/pdf/bi_dev_guide_bindings.pdf), declarative dynamic data references as described in the document at https://resources.docs.salesforce.com/latest/latest/en-us/sfdc/pdf/bi_dev_guide_bindings.pdf, or configuring filtering relationships between queries, all are applied to the decoupled runtime by the dashboard reconciler 602 without needing to fully reload the dashboard.

According to some implementations of the present disclosure, the dashboard reconciler 602 allows embedding pages to make changes to the dashboard metadata and have the changes automatically reflected in the dashboard UI and runtime. The dashboard reconciler 602 centralizes the loading of all data needed for the page into a single place, ensuring that the page performance requirement is met and data shown on the page is consistent. The data is kept consistent even when a user changes the data on the screen.

According to some implementations of the present disclosure, the dashboard reconciler 602 allows dashboard authors to directly edit the declarative metadata of specific queries and widgets. This is commonly used when writing programmatic bindings. The dashboard reconciler 602 makes it possible for all changes to the metadata to be reflected in the runtime environment.

Figure 7A:
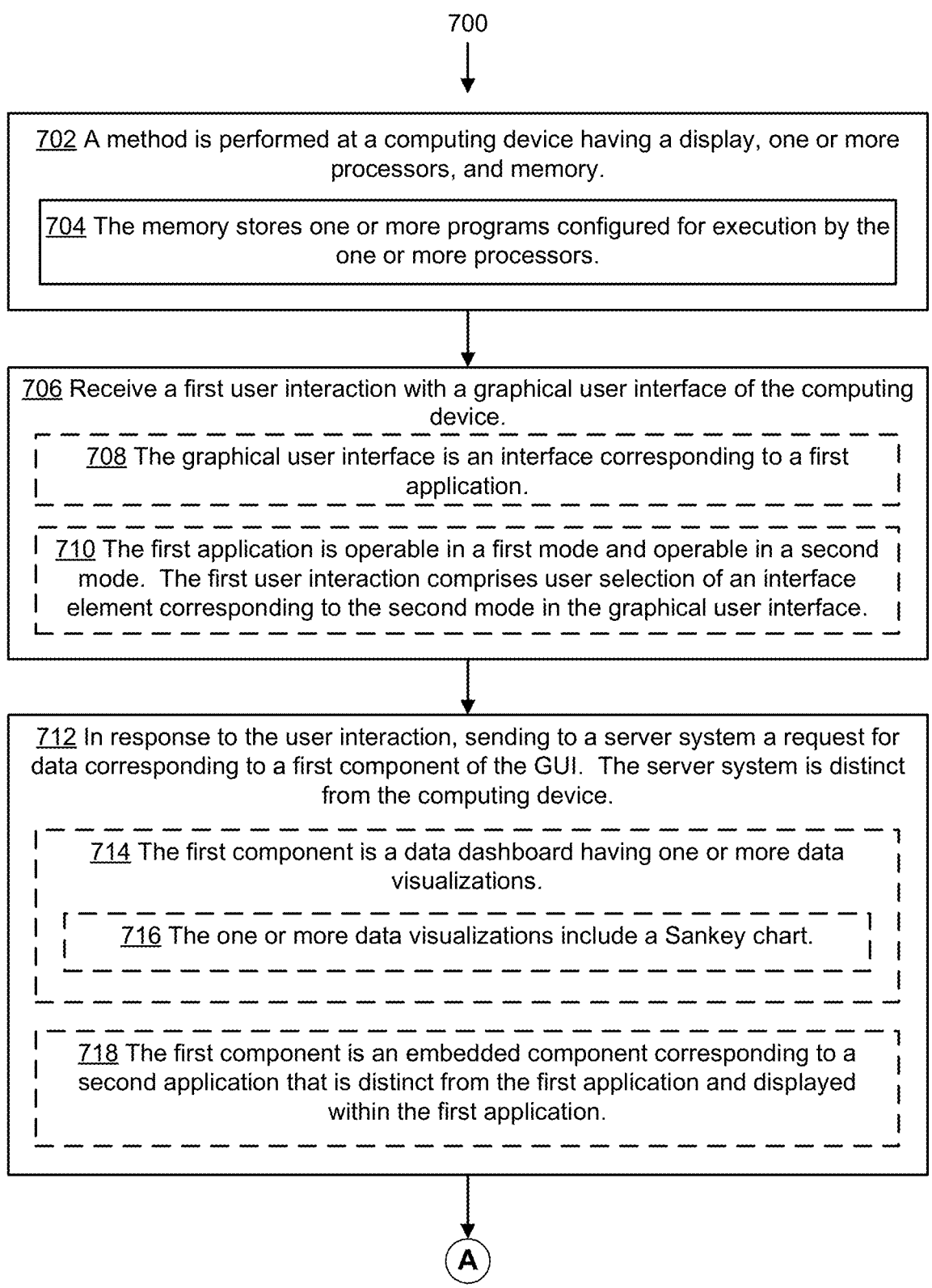
FIGS. 7A to 7C provide a flowchart of a method for embedding analytical visualizations in transactional dashboards according to some implementations.
Figure 7B:
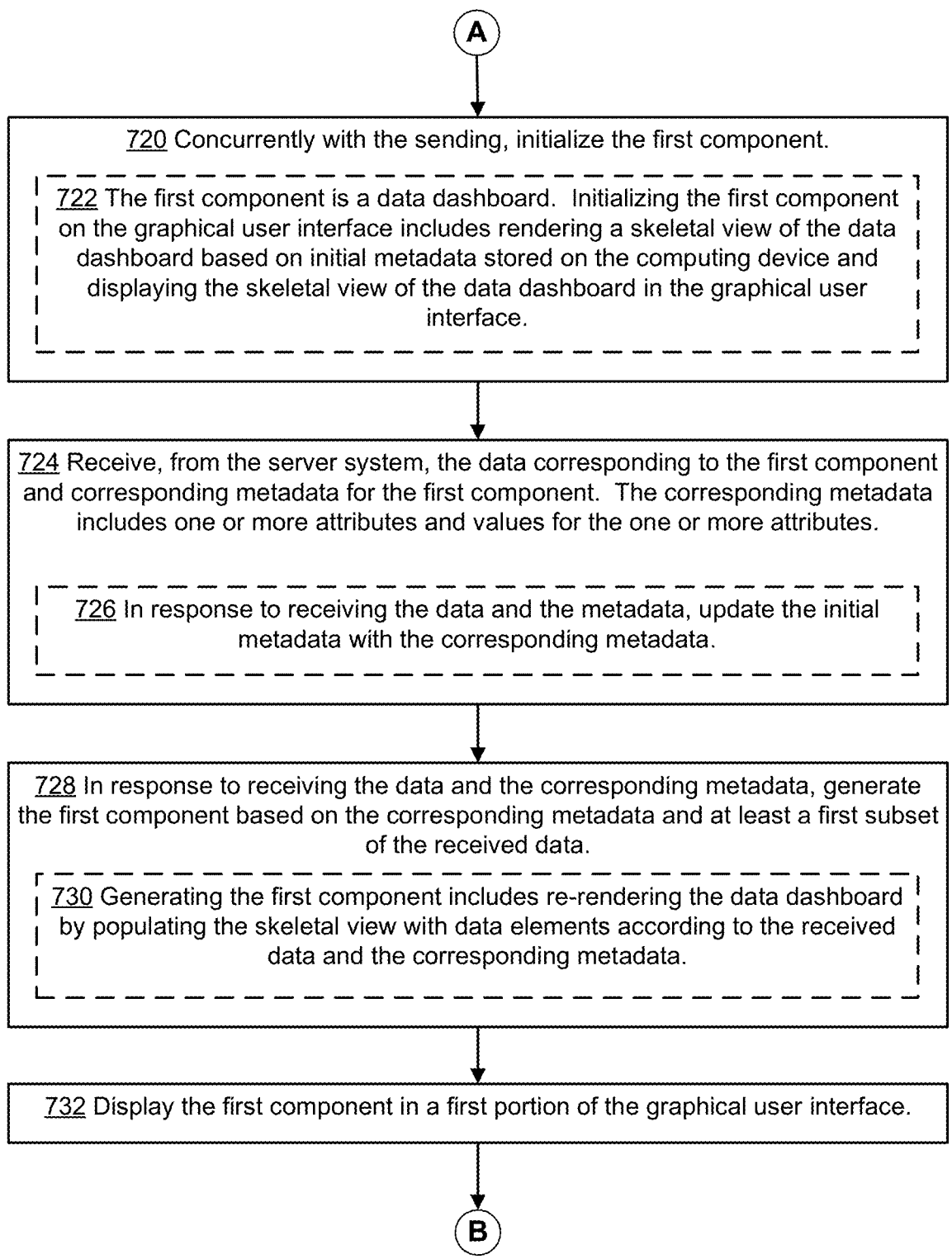
Figure 7C:
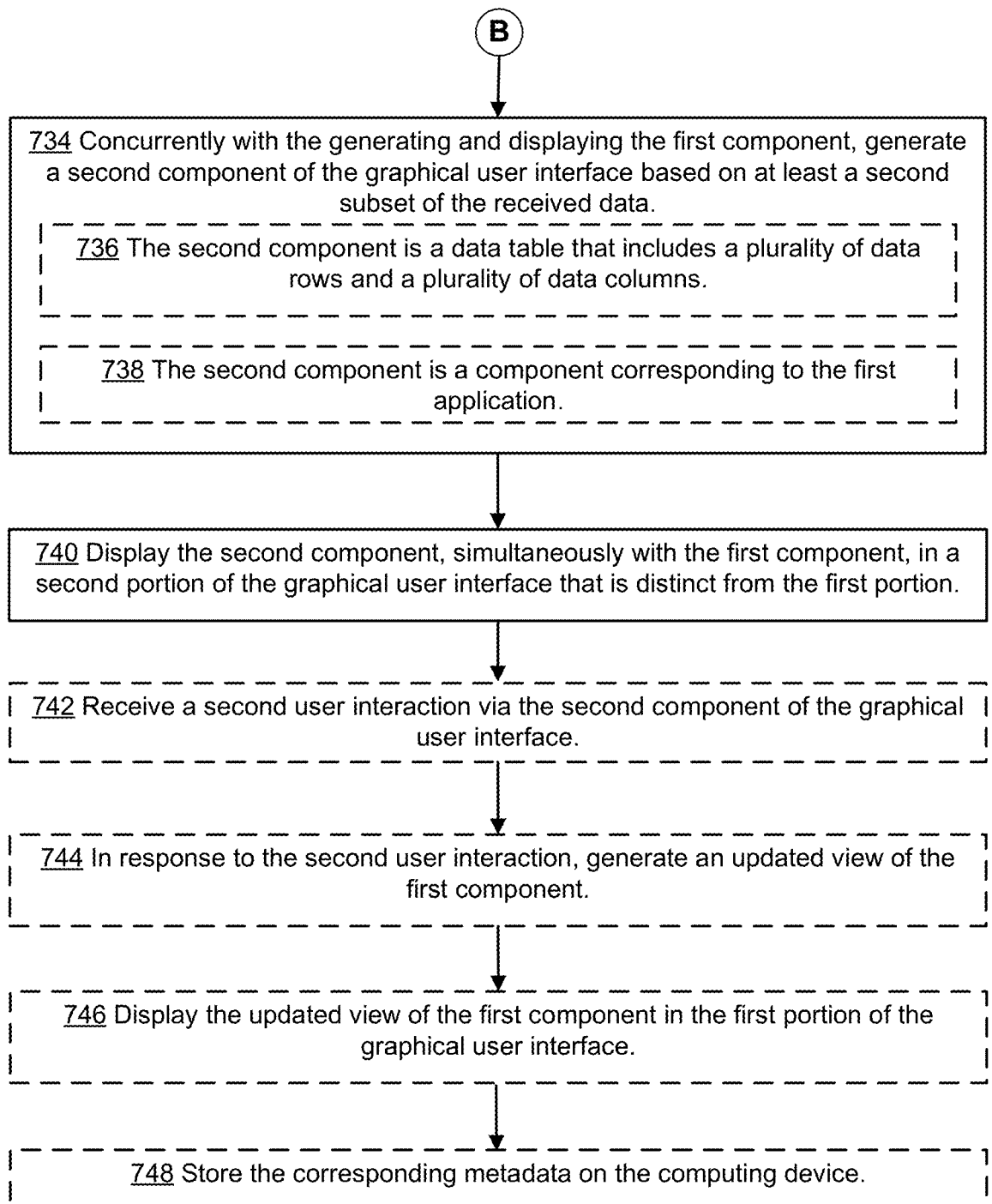

FIGS. 7A to 7C provide a flowchart of a method 700 for embedding analytical visualizations in transactional dashboards according to some implementations. The method 700 is also called a process.

The method 700 is performed (702) at a computing device 200 that has a display 208, one or more processors 202, and memory 206. The memory 206 stores (704) one or more programs configured for execution by the one or more processors 202. In some implementations, the operations shown in FIGS. 1, 2, 5A to 5F, and 6 correspond to instructions stored in the memory 206 or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 700 may be combined and/or the order of some operations may be changed.

The computing device 200 receives (706) a first user interaction with a graphical user interface 500 that is executed on the computing device. For example, in some instances, the first user interaction comprises user selection of the "Flow" tab 512 on the graphical user interface (e.g., to switch from the "Inspection" mode in FIG. 5A to the "Flow" mode in FIG. 5B). This is also illustrated in step 152 of FIG. 2.

In some implementations, the graphical user interface is (708) an interface (e.g., a transactional user interface, a transactional view, or a Pipeline inspection view) corresponding to a first application. For example, in some implementations, the first application is a transactional application 230, such as the Salesforce Core CRM application.

In some implementations, the first application is (710) operable in a first mode and operable in a second mode. For example, in some implementations, the first mode comprises the pipeline inspection mode (or inspection mode), which shows a list (e.g., a data table) of opportunities with KPI indicators, as illustrated in FIG. 5A. In some implementations, the second mode comprises the flow mode, as illustrated in FIG. 5B.

In some implementations, in response to the user interaction, the computing device 200, sends (712) to a server system (e.g., the Salesforce Core server 120) a request for data corresponding to a first component of the graphical user interface. The server system is distinct from the computing device.

In some implementations, the request for data corresponding to the first component is a request for data that is shared between the first component (e.g., an embedded component) and a second component (e.g., a non-embedded component) of the graphical user interface.

In some implementations, the first component is (714) a data dashboard (e.g., a CRMA dashboard component or a wave dashboard component) having one or more data visualizations.

In some implementations, the one or more data visualizations include (716) a Sankey chart (e.g., a Sankey diagram or an alluvial diagram). A Sankey chart is a visualization for depicting a flow from one set of values to another over time. A Sankey chart visually represents the flow of resources taking place in a process.

In some implementations, the first component is (718) an embedded component corresponding to a second application that is distinct from the first application and displayed within the first application.

For example, in some implementations, the first application is a transactional application, such as the Salesforce Core CRM application. The second application is an analytical application, such as the Customer Relationship Management Analytics (CRMA) application, the Tableau CRM application, or the Customer Relationship Management Analytics application.

Referring to FIG. 7B, in some implementations, the computing device 200, concurrently (e.g., simultaneously) with the sending, initializes (720) the first component.

In some implementations, the first component is (722) a data dashboard. Initializing the first component on the graphical user interface includes rendering a skeletal view (e.g., an initial view) of the data dashboard based on initial metadata stored on the computing device and displaying the skeletal view of the data dashboard in the graphical user interface.

For example, in some implementations, the initial dashboard metadata includes information to construct a "skeleton" to load UI elements/chunks for better performance. In some implementations, the initial metadata comprises basic metadata such as "one page," or "one widget in the center showing the text label 'Loading . . . ' In some implementations, the skeletal view includes a graphical element (e.g., a box) that represents a size and/or position of the first component on the graphical user interface.

In some implementations, displaying the skeletal view includes displaying a text label or a widget such as "Loading" (e.g., to notify a user that the data dashboard is being populated with data).

The computing device 200 receives (724) (e.g., retrieves), from the server system, the data corresponding to the first component and corresponding metadata for the first component. The corresponding metadata comprises one or more attributes and data values for the one or more attributes.

In some implementations, the first component is a dashboard component (e.g., CRMA dashboard component). The corresponding metadata for the dashboard component includes its state (e.g., the state of the CRMA dashboard), such as dashboard size, label positions, and information that defines the layout of the first component.

In some implementations, the data corresponding to the first component can be manually defined using a static flex step type. Details of the static flex step are described in https://developer.salesforce.com/docs/atlas.en-us.bi_dev_guide_json.meta/bi_dev_guide_json/bi_dbjson_steps_types_staticflex.htm, which is incorporated by reference herein in its entirety.

In some implementations, the first component is a Sankey chart. Data corresponding to the first component can include the Sankey chart data structure, and values such as opportunity IDs, start date category, end date category and/or current amount. The corresponding metadata includes a widget of the Sankey chart and its position, style, legend, and/or title.

In some implementations, the metadata is generated based on the shared data. For example, in FIG. 5, the list of opportunity groups aggregated by stage that are shown in the Sankey chart are generated dynamically based on the "shared data." Shared data by itself does not describe how the data should be visualized or made interactive. This detail is provided by the metadata. The view(s) of the graphical user interface 500 are generated and updated dynamically on-the-fly in a performant and fluid manner based on changes to shared data.

In some implementations, the corresponding metadata includes properties that define layouts, pages, widgets, and/or steps (e.g., Salesforce steps). Further details of the metadata are described in "Dashboard JSON Properties," at available https://developer.salesforce.com/docs/atlas.en-us.bi_dev_guide_json.meta/bi_dev guide_json/bi_dbjson_properties.htm, which is incorporated by reference herein in its entirety.

In some implementations, the server system generates metadata and/or values of the metadata based on shared data (e.g., data that is shared between the transactional application and the analytical application). In some instances, static flex steps (e.g., staticflex step type) are used to manually define a set of data that is shown in the first component. For example, a developer can use static flex steps to populate a list of static values in a toggle or list widget. Details of the staticflex step type properties can be found in: https://developer.salesforce.com/docs/atlas.en-us.bi_dev_guide_json.meta/bi_dev guide_json/bi_dbjson_steps_types_staticflex.htm, which is incorporated by reference herein in its entirety.

In some implementations, static flex steps provide values to a binding, such as filters, groups, measures, sort order, and limit. In some implementations, after retrieving (e.g., receiving) the data from the server system, the computing device converts the retrieved data into JSON objects and sets the data as the values of the step using a data structure like:

```
"steps": {
  "sankey_data": {
    "broadcastFacet": true,
    "columns": {
      "ids": {
        "type": "String"
      },
      "summaryField": {
        "type": "Number"
      },
      "startDate" : {
        "type": "String"
      },
      "today" : {
        "type": "String"
      }
    },
    "label": "sankey",
    "selectMode": "multi",
    "type": "staticflex",
    "values": [ ], // Will be replaced by sankey data
returned
    "numbers": [ ],
    "strings": [ ],
    "groups": [
      "startDate",
      "today"
    ]
  }
}
Sample values:
// commit to closed won
[{
ids :
"006S7000002V4YxIAK, 006S7000002Rj8gIAC,
006S7000002V4Z6IAK",
startDate : "Commit"
amount : 270555.2
today : "Closed Won"
} ]
```

In some implementations, the metadata comprises a JSON string.

In some implementations, to provide end users with more flexibility when viewing data dashboards, end users can select one or groupings (e.g., opportunity type or industry) and/or or measures (e.g., sum of amount or average of amount) to use in the graph. For example, in FIGS. 5B to 5F, the Sankey Chart data is grouped by start date forecasting category and end date (e.g., a current date), and measured by amount.

Referring again to FIG. 7B, in some implementations, in response to receiving the data and the metadata, the computing device 200 updates (726) the initial metadata with the corresponding metadata.

In response to receiving the data and the corresponding metadata, the computing device 200 generates (728) (e.g., renders) the first component (e.g., a Sankey chart or a data dashboard) based on the corresponding metadata and at least a first subset of the received data.

In some implementations, generating the first component includes re-rendering (730) the data dashboard by populating the skeletal view with data elements according to the received data and the corresponding metadata (e.g., the re-rendered dashboard includes bars, lines, and graphics).

The computing device 200 displays (732) the first component in a first portion of the graphical user interface.

With reference to FIG. 7C, in some implementations, concurrently (e.g., asynchronously, simultaneously, overlapping in time, and/or in parallel) with the generating and displaying the first component, the computing device 200 generates (734) a second component of the graphical user interface (e.g., a list view or a data table) based on at least a second subset of the received data. In some implementations, the second component comprises a list view (e.g., a table that includes data rows and data columns). In some implementations, the list view includes a subset of the data rows and/or data columns that are displayed in the "Inspection" Mode.

In some implementations, the second component is (736) a data table that includes a plurality of data rows and a plurality of data columns.

In some implementations, the second component is (738) a component corresponding to the first application.

The computing device 200 displays (740) the second component, simultaneously with the first data visualization, in a second portion of the graphical user interface that is distinct from the first portion.

In some implementations, the computing device 200 receives (742) a second user interaction via the second component of the graphical user interface. In response to the second user interaction, the computing device 200 generates (744) (e.g., renders) an updated view of the first component. The computing device 200 displays (746) the updated view of the first component in the first portion of the graphical user interface.

In some implementations, the computing device 200 stores (748) the updated metadata on the computing device.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory stores a subset of the modules and data structures identified above. Furthermore, the memory may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or implementations.

As used herein, the term "and/or" encompasses any combination of listed elements. For example, "A, B, and/or C" includes all of the following options for sets of elements:

A only, B only, C only, A and B without C, A and C without B, B and C without A, and a combination of all three elements, A, B, and C.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of embedding analytical visualizations in transactional dashboards, comprising:
at a computing device having a display, one or more processors, and memory storing one or more programs configured for execution by the one or more processors:
receiving a first user interaction with a graphical user interface of the computing device;
in response to receiving the first user interaction:
sending to a server system a request for data corresponding to a first component of the graphical user interface, wherein the server system is distinct from the computing device; and
concurrently with the sending, initializing the first component on the graphical user interface, including rendering a skeletal view of the first component based on initial metadata stored on the computing device;
receiving, from the server system, the data corresponding to the first component and corresponding metadata for the first component, the corresponding metadata different from the initial metadata and comprising one or more attributes and data values for the one or more attributes; and
in response to receiving the data and the corresponding metadata:
concurrently generating (i) the first component based on the corresponding metadata and at least a first subset of the received data and (ii) a second component of the graphical user interface based on at least a second subset of the received data;
displaying the first component in a first portion of the graphical user interface; and
displaying the second component, simultaneously with displaying the first component, in a second portion of the graphical user interface that is distinct from the first portion.

2. The method of claim 1, wherein:
the first component is a data dashboard having one or more data visualizations; and
the second component is a data table that includes a plurality of data rows and a plurality of data columns.

3. The method of claim 2, wherein the one or more data visualizations include a Sankey chart.

4. The method of claim 1, wherein:
the graphical user interface is an interface corresponding to a first application; and
the first component is an embedded component corresponding to a second application that is distinct from the first application and displayed within the first application.

5. The method of claim 4, wherein the second component is a component corresponding to the first application.

6. The method of claim 4, wherein:
the first application is operable in a first mode and operable in a second mode; and
the first user interaction comprises user selection of an interface element corresponding to the second mode in the graphical user interface.

7. The method of claim 1, wherein:
the first component is a data dashboard;
rendering the skeletal view of the first component includes rendering the skeletal view of the data dashboard based on the initial metadata stored on the computing device; and
the method further includes displaying the skeletal view of the data dashboard in the graphical user interface.

8. The method of claim 7, further comprising:
in response to receiving the data and the corresponding metadata:
updating the initial metadata with the corresponding metadata,
wherein generating the first component includes re-rendering the data dashboard by populating the skeletal view with data elements according to the received data and the corresponding metadata.

9. The method of claim 1, further comprising:
receiving a second user interaction via the second component of the graphical user interface; and
in response to the second user interaction:
generating an updated view of the first component; and
displaying the updated view of the first component in the first portion of the graphical user interface.

10. The method of claim 1, further comprising:
storing the corresponding metadata on the computing device.

11. A computing device, comprising:
a display;
one or more processors; and
memory coupled to the one or more processors, the memory storing one or more programs configured to be executed by the one or more processors, the one or more programs including instructions for:
receiving a first user interaction with a graphical user interface of the computing device;
in response to receiving the first user interaction:
sending to a server system a request for data corresponding to a first component of the graphical user interface, wherein the server system is distinct from the computing device; and
concurrently with the sending, initializing the first component on the graphical user interface, including rendering a skeletal view of the first component based on initial metadata stored on the computing device;
receiving, from the server system, the data corresponding to the first component and corresponding metadata for the first component, the corresponding metadata different from the initial metadata and comprising one or more attributes and data values for the one or more attributes; and
in response to receiving the data and the corresponding metadata:
concurrently generating (i) the first component based on the corresponding metadata and at least a first subset of the received data and (ii) a second component of the graphical user interface based on at least a second subset of the received data;
displaying the first component in a first portion of the graphical user interface; and displaying the second component, simultaneously with displaying the first component, in a second portion of the graphical user interface that is distinct from the first portion.

12. The computing device of claim 11, wherein:
the first component is a data dashboard having one or more data visualizations; and
the second component is a data table that includes a plurality of data rows and a plurality of data columns.

13. The computing device of claim 11, wherein:
the graphical user interface is an interface corresponding to a first application; and
the first component is an embedded component corresponding to a second application that is distinct from the first application and displayed within the first application.

14. The computing device of claim 13, wherein the second component is a component corresponding to the first application.

15. The computing device of claim 13, wherein:
the first application is operable in a first mode and operable in a second mode; and
the first user interaction comprises user selection of an interface element corresponding to the second mode in the graphical user interface.

16. The computing device of claim 11, wherein:
the first component is a data dashboard;
rendering the skeletal view of the first component includes rendering the skeletal view of the data dashboard based on the initial metadata stored on the computing device; and
the instructions further include displaying the skeletal view of the data dashboard in the graphical user interface.

17. A non-transitory computer-readable storage medium storing one or more programs, the one or more programs comprising instructions, which when executed by a computing device having a display, cause the computing device to perform operations comprising:
receiving a first user interaction with a graphical user interface of the computing device;
in response to receiving the first user interaction:
sending to a server system a request for data corresponding to a first component of the graphical user interface, wherein the server system is distinct from the computing device; and
concurrently with the sending, initializing the first component on the graphical user interface, including rendering a skeletal view of the first component based on initial metadata stored on the computing device;
receiving, from the server system, the data corresponding to the first component and corresponding metadata for the first component, the corresponding metadata different from the initial metadata and comprising one or more attributes and data values for the one or more attributes; and
in response to receiving the data and the corresponding metadata:
concurrently generating (i) the first component based on the corresponding metadata and at least a first subset of the received data and (ii) a second component of the graphical user interface based on at least a second subset of the received data;
displaying the first component in a first portion of the graphical user interface; and
displaying the second component, simultaneously with displaying the first component, in a second portion of the graphical user interface that is distinct from the first portion.

18. The non-transitory computer-readable storage medium of claim 17, wherein:
the first component is a data dashboard;
rendering the skeletal view of the first component includes rendering the skeletal view of the data dashboard based on the initial metadata stored on the computing device; and
the operations further include displaying the skeletal view of the data dashboard in the graphical user interface.

19. The non-transitory computer-readable storage medium of claim 18, the operations further comprising:
in response to receiving the data and the corresponding metadata:
updating the initial metadata with the corresponding metadata,
wherein generating the first component includes re-rendering the data dashboard by populating the skeletal view with data elements according to the received data and the corresponding metadata.

20. The non-transitory computer-readable storage medium of claim 17, the operations further comprising:
receiving a second user interaction via the second component of the graphical user interface; and
in response to the second user interaction:
generating an updated view of the first component; and
displaying the updated view of the first component in the first portion of the graphical user interface.

* * * * *